United States Patent Office 3,318,449
Patented May 9, 1967

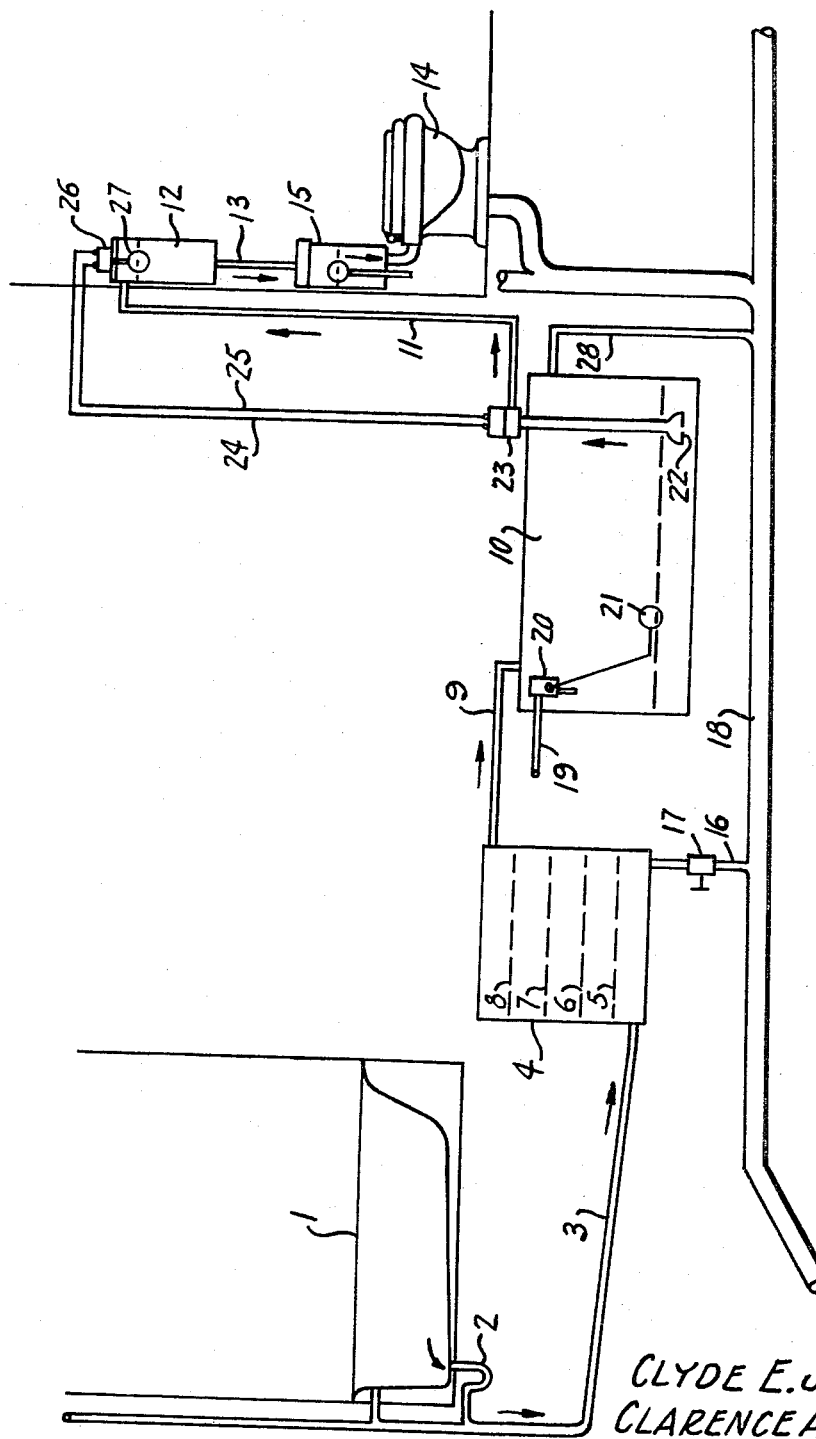

3,318,449
WATER RE-USE SYSTEM
Clyde E. Jennings, 419 N. Bridge St., Visalia, Calif. 93277, and Clarence A. Rowland, 94 Morningside Drive, Rte. 2, Hidden Valley, Loomas, Calif. 95650
Filed Aug. 3, 1966, Ser. No. 569,867
10 Claims. (Cl. 210—104)

This is a continuation-in-part application of application Ser. No. 366,194, filed May 8, 1964, now abandoned.

This invention relates to a system for re-using water, primarily household cleaning water, for sanitary purposes such as for toilet flushing.

The object of this invention is the provision of a household water re-use system to save water in areas where water is inadequate or metered whereby a substantial portion of the household water is re-used.

A further object of this invention is the provision of a cleaning water re-use system which will minimize sewage disposal facility requirements.

A further object of this invention is the provision of a water re-use system for saving water and for minimizing water sewage disposal facility requirements.

An additional object of this invention is the provision of a novel plumbing system for filtering, storing and re-using cleaning waters for sanitary purposes.

The provision of a system for collecting, filtering, storing and re-using household water for toilet flushing is a further object of this invention.

The provision of a novel plumbing system for water re-use is an additional object of this invention.

Additional objects of this invention will also appear from the following specification and from the drawing to which reference is made.

The drawing illustrates in schematic the water re-use plumbing system of this invention.

With reference now to the drawing, a bathtub 1 including a trap 2 and other conventional plumbing interconnections is shown as illustrative of the source of water which may be re-used. It will be realized that water may be re-used from other sources as well. For example, water may be re-used from a shower, from a wash basin, from laundry facilities, or from other cleaning facilities, and any facility which only partially contaminates the water and does not seriously pollute it.

The cleaning water to be re-used is conducted through a first conduit 3 to a filter vessel 4 which, preferably, includes a plurality of filtering layers 5, 6, 7 and 8. Filtering layer 5 may be coarse for separating solid materials of large size, filtering layer 6 may be of medium size for additional filtering and filtering layers 7 and 8 may be fine for the final filtering action. Of course it will be understood that the exact construction and design of the filter may depend upon the source and nature of the water to be re-used.

The filtered water is conducted through a second conduit 9 to a main storage tank 10 which serevs as a reservoir for the re-use system. A third conduit 11 interconnects the storage tank 10 and an auxiliary flush tank 12 from which the filtered water may flow through a fourth conduit 13 to a toilet fixture 14 which may include a toilet flushing tank 15.

The course of flow then is from the bathtub through the filter to the main storage tank and through the auxiliary flush tank to the toilet fixture.

Returning now to the filter vessel 4, the fifth conduit 16 including a valve 17 interconnects the filter vessel 4 with a sewer line 18. The conduit 16 and drain valve 17 are provided for clean-out of the filter vessel 4.

Since the amount of cleaning water to be re-used may not always satisfy the requirements for sanitary uses, such as for flushing toilet 14, a domestic water inlet conduit 19 is provided into the main storage tank 10. A valve 20 which is actuated in response to the position of a float 21 is provided for controlling the in-flow of domestic water into the storage tank 10. Obviously, any necessary one-way valves or other protective systems to prevent contamination of the domestic water supply may be provided according to the normal skill in the trade.

The filtered water is caused to flow, in a preferred embodiment, from the main storage tank 10 through a down pipe 22, which forms a water seal to prevent flow of gases and odors from above the water level, through conduit 11 by means of a pump 23 which is operatively connected by means of lines 24 and 25 to a float sensing valve 26 which operates in response to float 27. When the water level in the auxiliary tank 12 is reduced by the outflow of filtered water into the toilet fixture 14, the float is lowered and actuates valve 26 which in turn causes pump 23 to replenish the supply of filtered water in the auxiliary tank 12.

There may also arise situations where more cleaning water is used than is necessary to supply the sanitary re-use portion of the system. Such excess water may be permitted to flow to sewer line 18 through overflow conduit 28. Overflow conduit 28 also vents the main storage tank to the sewer line 18.

In operation, the water to be re-used is filtered and stored in the main storage tank. The liquid level in the main storage tank is maintained at least as high as the down pipe which leads to the auxiliary flush tank and may reach above this height if there is excess inflow of filtered water from the sources of water which is to be re-used. The filtered water is then caused to flow to an auxiliary tank, which in a preferred embodiment, is located at a point higher than the toilet fixture to permit gravity downflow from the auxiliary flush tank to the toilet fixture. It will be realized that while the toilet fixture of the drawing is of a conventional type and includes flush tank 15, toilets which do not include a flush tank but rather include a valve, may also be used.

In buildings or locations where the sources of water to be re-used originate at a higher gravitational potential than the points of re-use, it would not be necessary to provide a pump, for example pump 23, in the system to elevate the filtered water for re-use. In such situations, a flow actuated valve or other means to control the flow of filtered water from the main storage tank to the auxiliary tank or other re-use point may be provided.

In addition, while the invention has been described with relation to re-using the water for sanitary purposes such as flushing a toilet, it will be understood that the filtered water may be re-used in any manner or at any place where purity is not an essential element.

While the above invention has been described with specific reference to the uses and fixtures which would occur

We claim:
1. A self-acting system for reclaiming used cleaning water and the like for toilet flushing purposes comprising
a filter vessel for filtering the used water,
a first conduit for supplying the used water to the filter,
a storage tank for storing the filtered water,
a domestic water supply conduit connected to the storage tank, and
means responsive to the liquid level in the storage tank for controlling entry of domestic water into the storage tank from the domestic water conduit,
a second conduit interconnecting the filter vessel and the storage tank for conducting the filtered water from the filter to the storage tank,
an auxiliary flush tank,
a third conduit interconnecting the storage tank and the auxiliary flush tank for conducting the filtered water therebetween,
a toilet fixture,
a fourth conduit interconnecting the toilet fixture and the auxiliary flush tank to conduct the filtered water therebetween, and
means responsive to the liquid level in the auxiliary flush tank for causing the filtered water to flow from the storage tank to the auxiliary flush tank to replenish the filtered water supplied to the toilet fixture.

2. The system of claim 1 wherein the toilet includes a flushing tank which is supplied by the auxiliary flushing tank with filtered water through the fourth conduit.

3. The system of claim 2 wherein the means for causing the filtered water to flow from the storage tank to the auxiliary flush tank includes a pump responsive to the liquid level in the auxiliary flush tank.

4. The system of claim 3 wherein the auxiliary flush tank is located at a point higher than the toilet fixture for permitting gravity flow of the filtered water from the auxiliary flush tank to the toilet fixture.

5. The system of claim 1 further including a fifth conduit interconnecting the filter vessel and a sewer line and means in said fifth conduit for selectively permitting water to flow from the filter vessel to the sewer line.

6. The system of claim 1 wherein the auxiliary flush tank is located at a point higher than the toilet fixture for permitting gravity flow of the filtered water from the auxiliary flush tank to the toilet fixture.

7. The system of claim 6 further including
a fifth conduit interconnecting the filter vessel and a sewer line,
means in the fifth conduit for selectively permitting water to flow from the filter vessel to the sewer line, and
a sixth conduit interconnecting the storage tank and the sewer line to provide an overflow to the sewer line.

8. A self-acting system for reclaiming used cleaning water and the like for toilet flushing purposes comprising
a filter vessel for filtering the used water,
a first conduit for supplying the used water to the filter,
a storage tank for storing the filtered water,
a second conduit interconnecting the filter vessel and the storage tank for conducting the filtered water from the filter to the storage tank,
an auxiliary flush tank,
a third conduit interconnecting the storage tank and the auxiliary flush tank for conducting the filtered water therebetween,
a toilet fixture,
a fourth conduit interconnecting the toilet fixture and the auxiliary flush tank to conduct the filtered water therebetween,
a fifth conduit interconnecting the filter vessel and a sewer line and means in said fifth conduit for selectively permitting water to flow from the filter vessel to the sewer line, and
means responsive to the liquid level in the auxiliary flush tank for causing the filtered water to flow from the storage tank to the auxiliary flush tank to replenish the filtered water supplied to the toilet fixture.

9. The system of claim 8 wherein the auxiliary flush tank is located at a point higher than the toilet fixture for permitting gravity flow of the filtered water from the auxiliary flush tank to the toilet fixture.

10. The system of claim 8 further including
a domestic water supply conduit connected to the storage tank, and
means responsive to the liquid level in the storage tank for controlling entry of domestic water into the storage tank from the domestic water conduit.

References Cited by the Examiner

UNITED STATES PATENTS

| | | | |
|---|---|---|---|
| 142,722 | 9/1873 | Pearson | 210—257 |
| 1,567,033 | 12/1925 | Caps | 210—258 X |
| 3,112,497 | 12/1963 | Call | 4—2 X |
| 3,183,525 | 5/1965 | O'Brien et al. | 4—1 |

FOREIGN PATENTS 657,541  2/1963  Canada.

REUBEN FRIEDMAN, *Primary Examiner.*

D. M. RIESS, *Assistant Examiner.*